US010832105B2

(12) United States Patent
Delfer et al.

(10) Patent No.: US 10,832,105 B2
(45) Date of Patent: *Nov. 10, 2020

(54) BITMAP PROCESSING OF DIGITAL DOCUMENTS

(71) Applicant: Broadridge Output Solutions, Inc., Newark, NJ (US)

(72) Inventors: Frank Delfer, Incline Village, CA (US); Marc J. Fagan, El Dorado Hills, CA (US); Charles Preston, Orangeville, CA (US)

(73) Assignee: Broadridge Output Solutions, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,880

(22) Filed: Oct. 28, 2019

(65) Prior Publication Data

US 2020/0057926 A1 Feb. 20, 2020

Related U.S. Application Data

(63) Continuation of application No. 16/195,093, filed on Nov. 19, 2018, now Pat. No. 10,460,218, which is a continuation of application No. 15/067,495, filed on Mar. 11, 2016, now Pat. No. 10,133,970.

(51) Int. Cl.
*G06F 3/12* (2006.01)
*G06K 15/02* (2006.01)
*G06K 15/00* (2006.01)

(52) U.S. Cl.
CPC ....... *G06K 15/1836* (2013.01); *G06F 3/1206* (2013.01); *G06F 3/1247* (2013.01); *G06F 3/1282* (2013.01); *G06K 15/181* (2013.01); *G06K 15/403* (2013.01)

(58) Field of Classification Search
None
See application file for complete search history.

(56) References Cited

U.S. PATENT DOCUMENTS 10,133,970 B1 * 11/2018 Delfer ................ G06K 15/1836
10,460,218 B2 * 10/2019 Delfer .................. G06F 3/1282

\* cited by examiner

*Primary Examiner* — Paul F Payer
(74) *Attorney, Agent, or Firm* — Greenberg Traurig, LLP

(57) ABSTRACT

A bitmap processing system for creating digital documents on a digital printing press by a fulfiller includes a fulfiller operated raster image processor that receives customer application Page Description Language (PDL) job files containing information for creating the digital documents and generates bitmaps in accordance with the files and a fulfiller operated editor that modifies the bitmaps so that the resulting documents process more efficiently in production steps downstream of a printing process.

10 Claims, 9 Drawing Sheets

BITMAP PROCESSING OF DIGITAL DOCUMENTS

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to utilizing bitmaps and images instead of page description language to improve digital document processing.

2. Background Discussion

One current means for effecting such data extraction and symbol insertion objectives (as described above) is for the client to write software that adds "flags" and "placeholders" to their print files before they are sent to the fulfiller, indicating from where the desired data is to be extracted, and to where the necessary modifications and/or control symbols are to be inserted.

The fulfiller uses a complimentary computer program to analyze and prepare the work for processing. The fulfiller must ensure that the program is compatible with the client's chosen Page Description Language (PDL) and flag/placeholder protocol. Often, to ensure compatibility, software engineers on the client's side work in parallel with programmers on the fulfiller's side to construct the two IT components simultaneously.

A graphical depiction of such an existing system is presented in FIG. 1 (labeled as PRIOR ART). Thus, FIG. 1 shows the "Current Digital Document Factory Process". Note that the results of the system include "Customer-Spec Docs with Fulfiller-Spec Control Symbols" and the procedure labeled "Efficient Finishing & Mailing", which are the objectives stated above. This current system provides an extremely broad range of services that fulfillment clients need. Such services range, for example, from inserting simple bar codes, to adding new pages and/or cover sheets, to implementing sophisticated trans-promotional marketing campaigns, and to changing output channels if a subscriber chose to receive paper mail one month and then electronic mail the next.

BRIEF SUMMARY

An object of the technology described herein is to provide services needed for cost-effective processes that maximize messaging effectiveness and minimize postage for clients by using software to extract metadata from print job files and modifying and/or inserting content and control symbols into the images contained in the files.

Another object of the technology described herein is to furnish a bitmap processing system for creating digital documents on a digital printing press by a fulfiller.

A further object of the technology described herein is to supply a bitmap processing system for creating digital documents on a digital printing press by a fulfiller with an advantage that on the Customer Side, little or no additional development, programming, or processing of the Customer Application PDL Job is required since all that is necessary is for the job to include sufficient identification information so that the fulfiller can recognize it reliably.

Still another object of the technology described herein is to disclose a bitmap processing system in which the data extracted from each job file is analyzed so that the fulfiller can determine the best means of processing the work and saving the most postage and the results of this analysis are used to control various factory and data center processes, as well as to modify images and compose control symbols.

Yet a further object of the technology described herein is to describe a bitmap processing system that functions by doing what must happen to every PDL file before it can be printed, and that is to convert it into a bitmap first (or image), using a Raster Image Processor (RIP) and, once in bitmap, or image, format, it does not matter what the original PDL format was, just like it does not matter what the original PDL format was after the file has been printed.

Disclosed is a bitmap processing system and method for creating digital documents on a digital printing press by a fulfiller (business entity), comprising: a fulfiller operated raster image processor that receives customer application Page Description Language (PDL) job files containing information for creating the digital documents and generates bitmaps in accordance with the files and a fulfiller operated editor that modifies the bitmaps so that the resulting documents process more efficiently in production steps downstream of a printing process, wherein the more efficiently processed downstream production steps include finishing and mailing. Additionally, the subject digital document bitmap processing system may further comprise an up stream utilization of a PDL editor that, using metadata extracted from the bitmaps, modifies an original customer application PDL, instead of the bitmaps, allowing the bitmaps to be discarded, with the resulting PDL alone carrying the necessary metadata via No Operation assembly language instructions (NOPs) and appropriate editing commands to alter the content of symbolic data such as letters, numbers, and bar codes, enabling the documents produced to process more efficiently in finishing and mailing production steps.

Additionally, disclosed is a bitmap processing system and method for creating digital documents on a digital printing press by a fulfiller. Comprising the subject technology is: a) a fulfiller operated raster image processor that receives customer application PDL job files containing information for creating the digital documents and generates bitmaps in accordance with the files and b) a fulfiller operated editor that modifies the bitmaps so that the resulting documents process more efficiently in production steps downstream of the printing process, e.g. finishing and mailing.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1A:
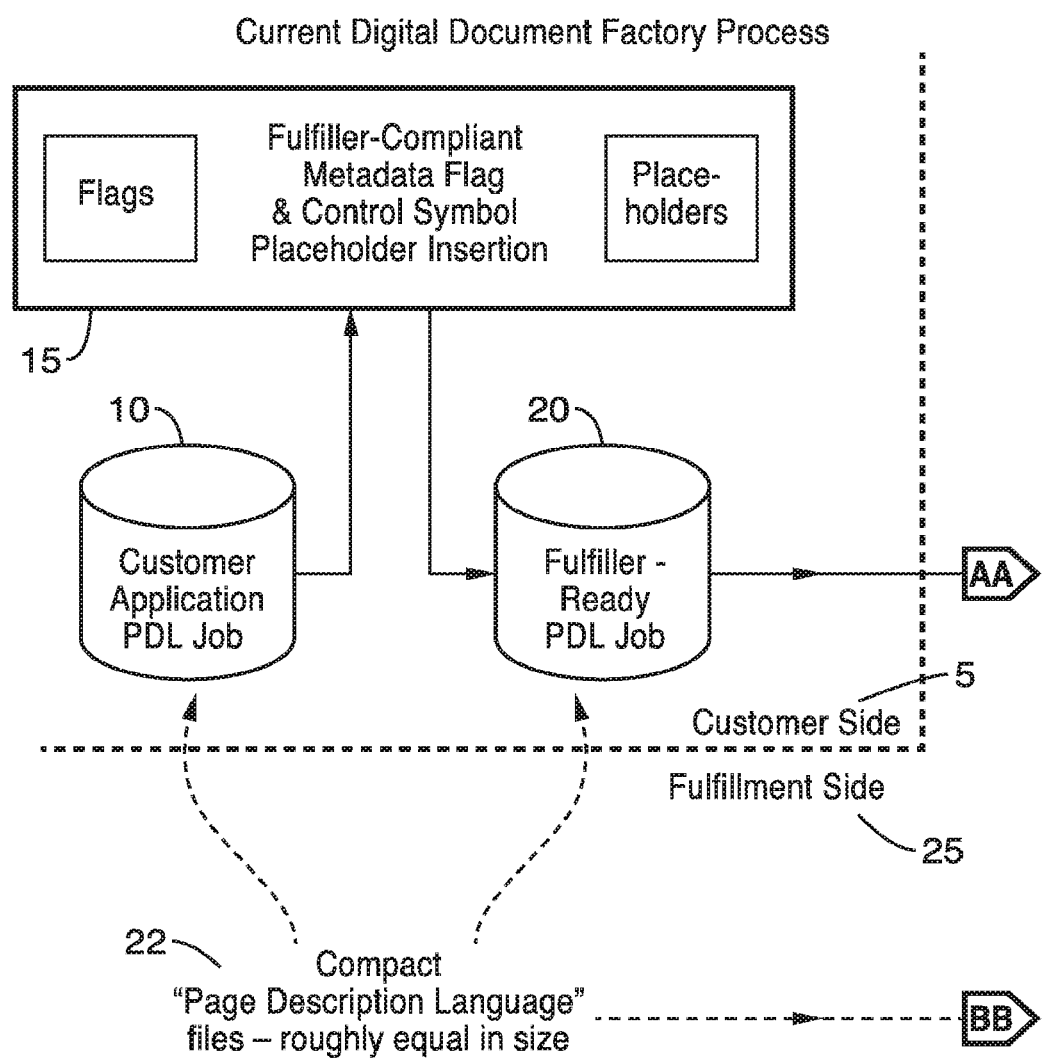
FIG. 1A depicts a first portion of the existing PRIOR ART for a "Current Digital Document Factory Process."

Referring more specifically to the drawings, for illustrative purposes the subject technology is embodied in the system generally shown in FIG. 2 and FIG. 3. It will be appreciated that the subject system may vary as to configuration and as to details of the components, and that the method may vary as to the specific steps and sequence, without departing from the basic concepts as disclosed herein.

In order to be competitive, providers of digital print and mail (fulfillment) services need cost-effective processes that maximize messaging effectiveness and minimize postage for clients. To meet this objective, fulfillers use sophisticated software to extract metadata from print job files and to modify and/or insert content and control symbols (e.g. bar codes) into the images contained in the files.

Print job files typically come to fulfillers in one of several industry-standard PDL formats, and the means by which the extraction, modification, and insertion are carried out is usually by operating on the PDL file itself. This means is accurate and efficient because PDL data is compact and highly structured.

The data extracted from each job file is analyzed so that the fulfiller can determine the best means of processing the work and saving the most postage. The results of this analysis are used to control various factory and data center processes, as well as to modify images and compose control symbols.

Together, the control information in the fulfiller's data center, and the machine-readable symbols on the client's documents, provide the fulfiller with an extremely effective means for reliably meeting the low cost, high postage savings goal. However, the cost of on-boarding new clients can be substantial, due of the amount of custom programming required. Often, the cost is higher than the sum of all the efficiencies that would be gained, so no on-boarding happens.

The subject improved system provides a means for dramatically lowering this cost, while delivering the same or nearly the same level of effectiveness and efficiency. The result is that a substantial amount of on-boarding opportunities that are not economically viable in the current state will be viable by utilizing the subject invention.

A graphical depiction of the subject system is presented in FIG. 2 as the "E-Z Digital Document Factory Process". Although the new improved subject process is dramatically easier for both the client and the fulfiller, the results still include, as before, "Customer-Spec Docs with Fulfiller-Spec Control Symbols" and the procedure is once again labeled "Efficient Finishing & Mailing".

The subject system also provides all, or substantially all, of the same range of services as the current system, including adding simple bar codes, inserting new pages and/or cover sheets, implementing sophisticated trans-promotional marketing campaigns, and changing output channels if a subscriber chose to receive paper mail one month and then electronic mail the next.

A primary advantage of the novel subject system is that on the Customer Side, little or no additional development, programming, or processing of the Customer Application PDL Job is required. All that's necessary is for the job to include sufficient identification information so that the fulfiller can recognize it reliably. This is one reason that the subject system is easier to utilize for the client.

At first glance, it might seem that the fulfiller is now facing a much more challenging assignment: Not only are there no flags or placeholders in the PDL file anymore, but the particular PDL itself might be any one of several different industry standard formats.

The new subject system solves this problem by doing what must happen to every PDL file before it can be printed, and that is to convert it into a bitmap first (or image), using a Raster Image Processor (RIP). Once in bitmap, or image, format, it does not matter what the original PDL format was, just like it does not matter what the original PDL format was after the file has been printed.

Thus, the subject system carries out extraction, modification, and insertion functions at the bitmap, or image, level, using in-house and off-the-shelf decoding tools and in-house and off-the-shelf composition tools. Any information that is "visible", such as addresses, account numbers, and bar codes, is available for extraction. Also, any "cut-and-paste" operation that makes sense to the naked eye is available for composition. PDL-level extraction is no longer required (though it is still allowed).

Also, all extraction operations are carried out by a single parameterized program, so that the same program can be used for different jobs, and different clients, depending on the parameters. The same goes for all modification operations: a single parameterized program works for all jobs.

The parameters for each application are stored in computer files called "scripts", which serve as a set of instructions for the extraction and composition processes. Since the format of the instructions is controlled by the fulfiller, they do not need to be in any standard programming language. Therefore, the fulfiller is free to design the scripting protocol to require only the skills of a trained analyst, rather than a software engineer, to create them. This is one reason the subject system is easier for the fulfiller's new client onboarding operation.

Finally, the novel subject system cleverly avoids requiring the fulfiller to store substantial quantities of bitmaps in its data center. Since bitmaps typically require between 100 and 1,000 times more storage space than their corresponding PDL files, this feature makes it possible to implement and operate the subject system without major data center infrastructure investments. This makes the subject system easier to implement for the fulfiller's data center operation.

Detailed Description of the Subject Processes

It is important to note that both the Current State and the Subject Invention State processes share identical beginning and ending states in that they both start with "Customer Application PDL Job" and both finish with "Customer-Spec Docs with Fulfiller-Spec Control Symbols" and "Efficient Finishing & Mailing". These conditions are the fundamental requirements of both solutions, however, the subject invention is much more cost effective and more easily implemented solution.

Also common between the two systems is the Digital Printing Press that produces the physical documents, and the Inserting Control File and Mailing Control File that contain the information used by the document factory to finish and mail the job properly. These commonalities are coincidental.

1. Customer-Side:

In the currently used process, the customer's job is made fulfiller-compliant before it crosses the boundary over to the Fulfiller Side. This is achieved through the Customer Side process "Fulfiller-Compliant Metadata Flag and Control Symbol Placeholder Insertion". Each of the customer's print jobs goes through this process, which adds non-printing information to the file that the fulfiller needs to carry out the work in conformance with the customer agreement.

The job file must be in one of several industry-standard Page Description Language (PDL) formats. A common trait of these formats is that they are extremely volume-efficient, i.e. they contain only the instructions and the resources needed by the print controller to compose the desired images, rather than the images themselves. This allows the files to be, typically, only $\frac{1}{100}^{th}$ to $\frac{1}{1000}^{th}$ the size of the bitmaps that the print controller will ultimately present to the Digital Printing Press.

The other important trait of PDL files is that the instructions which control the composition of symbolic information, such as letters and numbers and machine-readable symbols, like bar codes, contain the information component of those symbols in common computer formats such as ASCII or EBCDIC. This makes it easy for computers to inspect and manipulate such information inside the PDL with perfect fidelity (i.e. without errors).

These two traits make the "Fulfiller-Ready PDL Job" perfectly suited to the fulfiller's needs: it is compact and it contains all the information necessary to reliably carry out the work in conformance with the customer agreement.

2. Extraction and Composition:

In the current state, once the job crosses over to the Fulfillment Side, it is matched up with the fulfiller's application-specific Extraction and Composition process. The term "application" refers to the type of job, and customers typically have several, such as: statements; bills; invoices; or letters. Often, different job types come from different divisions or business units within the customer's company, which leads to the PDL data formats being very different as well. Thus, the extraction and composition process often needs to be unique for each different application.

The purpose of the extraction and composition process is to pull out of the PDL all the metadata needed to produce the job properly, as well as to modify the PDL to make the finished documents "look the way" the customer and the fulfiller agree they ought to look (the printed document).

The advantage of a dedicated PDL-level process is that it can efficiently extract metadata with perfect fidelity, plus the source of the metadata can be either printing or non-printing PDL content. An example of non-printing content is a font callout, such as "Times New Roman".

The flags and placeholders that the customer puts into the PDL allow the fulfiller to reliably carry out all the agreed extraction and composition duties, even if the customer occasionally makes changes elsewhere in the PDL, for example, to support new marketing campaigns or regulatory messages.

The output of the process is: 1) the modified and now "Factory-Ready PDL" and 2) the new file "Factory-Ready Metadata".

3. Control Symbol Insertion and Production Plan:

The next stage of the current process completes preparation of the job for production, by accounting for factory-specific variables that have not mattered to this point, such as: postage; plant location; equipment type; as well as the zip codes on the documents of other jobs that will be produced on the same day, which could impact mailing operations.

The results include customary IT outputs that support accounting, reporting, and so on, which are the same types of information that any data processing business would need, plus industry-specific outputs that make up the Production Plan. Examples of production plan outputs are the "Inserting Control File" and "Mailing Control File", which are used to implement the desired "Efficient Finishing and Mailing" process.

The final output is the "Printer-Ready PDL Job", which now includes individually-populated control symbols that encode data which matches the contents of the corresponding Inserting Control File and the Mailing Control File. This ensures that the documents ultimately produced by the Digital Printing Press will be recognized by the finishing and mailing equipment as corresponding properly with the commands in the control files.

4. Commercial Print Controller and Raster Image Processor (RIP):

In the current state, the format of the data in the "Printer-Ready PDL Job" is still one of several industry-standard formats, so that the Print Controller and Raster Image Processor (RIP) can produce bitmaps in a predictable way. Since the print controller is a Commercial Off-The-Shelf (COTS) product, it can do whatever the PDL job asks, as long as the request is supported by the controller. But since it can do no more than that, the fulfiller must ensure that the PDL file contains 100% of the job-specific information necessary to produce "Customer-Spec Docs with Fulfiller-Spec Control Symbols".

The RIP supplies to the print heads on the Digital Printing Press uncompressed, color-separated bitmaps that are typically 100 to 1,000 times larger in volume than the PDL files that created them. This exponential increase in data volume is referred to as inflation, and traditionally inflation on this scale has meant that the notion of storing bitmaps, for later retrieval, was out of the question for economic reasons.

By way of example, a single state-of-the-art digital color printer requires 600×600×4 bits per square inch, or 180,000 bytes. Multiplied by 17 inches per side, times two sides, times 12 inches per foot, times 12.5 feet per second, the minimum data rate becomes 918,000,000 bytes per second or 3.3 terabytes per hour. Such a stupendous level of data creation is the reason why print controllers have traditionally been matched with, and packaged inside, printing systems: So that after the bitmaps were turned over to the print heads they could be discarded.

5. E-Z Digital Document Factory Process—Customer-Side (Additionally, See Specifically FIGS. 2A, 2B, and 2C and Detailed Discussion Below):

In the subject process (termed the "E-Z" version); the job file is again in any of several industry-standard Page Description Language (PDL) formats. What is different is, as long as it contains sufficient identification information, no further processing on the Customer Side is necessary. It comes straight across to the Fulfiller Side unchanged.

6. Multi-PDL RIP and Bitmap-Level Extraction:

Once a job file has crossed over to the Fulfillment Side, the job is turned over to the "Universal Multi-PDL RIP and Bitmap-Level Extraction" process. Initially, this process is identical to the "Commercial Print Controller and RIP" process above, in that it supports a variety of industry standard PDL formats and produces bitmaps from them in a predictable way. However, the bitmaps are not turned over to the print heads.

The original Customer PDL that led to the bitmap's creation is no longer required at this point (unless the fulfiller chooses the option of extracting PDL data too). Thus, the "picture" of the document that now lies in the computer's memory is the only thing required in order to proceed.

Unlike an actual picture of a document obtained, for example, by an ordinary desktop scanner, the one obtained through the RIP is in a perfectly-rendered state. It is as if the document had been printed and scanned, but somehow the scan was obtained with perfect fidelity, such that every single one of the 134,640,000 bits that make up a letter-sized image came through error-free.

Once each page of bitmap data is generated, instead of being turned over to the print heads, it is inspected in accordance with an application-specific "Extraction Script". This script contains a list, or map, of regions on the document where information of a particular type is to be decoded from the arrays of 1's and 0's that make up the bitmap; the results of the decoding process, the metadata, is stored in a file.

The subject process allows for the extraction script to be quite simple, so simple in fact that it could be generated manually, perhaps by a skilled analyst composing it using a text editor. The fulfiller is free to make the extraction script as simple or as complex as it wants, and to acquire it from whatever source is most convenient.

The perfect quality of the image is the reason the fulfiller can expect the extraction logic to reliably decode whatever information is "visible" in the image, such as text and machine-readable symbols like bar codes, plus graphical information such as the position of lines or colors. The fulfiller is free to include in the extraction process in-house software to decode the images, or Commercial Off-The-Shelf (COTS) software tools of its choosing. The important thing for the fulfiller is that the process is based on the use of either in-house software or COTS products that it controls, and is therefore not dependent on any single supplier.

If the fulfiller chooses not to extract information directly from the PDL file, any non-printing information that had been in the PDL would not be extractable from the images, such as the names of fonts.

By making PDL extraction optional, not only can any RIP-able PDL now be processed by the fulfiller, there is not necessarily any limit to the extraction process's sophistication. Thus, a level of extraction sophistication equivalent to the current process is not out of the fulfiller's reach.

The subject metadata extraction service can be thought of as employing a tool box, of any size, that can handle whatever gamut of RIP and decode requirements are encompassed by the breadth of capabilities spanned by the suite of tools available. In addition, incorporating new tools into the suite can only expand the breadth and widen the gamut.

Similarly, the Extraction Script is a wholly contrived device that operates independently of any COTS product, as is the manner in which the script and the service interact. The format of the instructions is controlled by the fulfiller (it does not need to be in any formal programming language) so the fulfiller is free to design the scripting protocol to require only the skills of a trained analyst, rather than a software engineer, to create them. Thus, the fulfiller is free to tailor the extraction process to meet its needs, since all three components (the script, the language, and the service) are all under the fulfiller's control and not dependent on any single vendor or product. Once the extraction process for each image is complete, the fulfiller could choose to store the images (because they will be used again later in the process); however, an important advantage of the design is that the fulfiller does not need to store the images. They can be discarded now and re-created again later, if desired. The fulfiller is free to choose either method, but because the next use of the images may be hours or even days in the future, the stupendous size of the data storage system required to buffer all the bitmaps makes it far more economical to just re-create them again later, providing the fulfiller controls the composition process as well. That is why the subject process specifically and intentionally provides for the re-creation RIP to use the exact same rasterization process as was used initially: The fulfiller can rely on the images being re-created with perfect fidelity, exactly as if they had been stored on conventional high volume storage such as disk or tape. The output of the subject process is the "Factory-Ready Metadata" called for by the Extraction Script, as well as the original PDL job, which remains in the exact same compact state that it was in when the customer delivered it.

Note that the fulfiller is free to place composition instructions, alongside extracted data, in the Factory-Ready Metadata file, simply by specifying as much in the Extraction Script. Such instructions, which will be executed later, in the composition process, could include, for example: the addition of cover sheets; advertising material; or campaign messages, plus instructions which are dependent on or include the results of extracted data.

7. Control Symbol Insert Plan, Composition Plan, and Production Plan Process:

The next stage of the subject process, Plan Generation, completes preparation of the job for production, in a somewhat similar way as the current-state process. Part of such preparation includes accounting for the same factory-specific variables as before, but it now also accounts for composition requirements that had formerly been carried out already, and had resided inside the current process's "Factory-Ready PDL".

As before, the results include ordinary IT outputs that support accounting, reporting, and so on, plus the Inserting Control File and Mailing Control File, which are still used to implement the desired "Efficient Finishing and Mailing" process.

However, whereas the current-state process created a new "Print-Ready" version of the PDL job, the subject process instead creates a "Composition Script". The composition script is a file containing a set of instructions for how the original bitmaps should be changed before they are turned over to the print heads. The composition script is allowed to be extremely simple, so simple in fact that it could be generated manually, perhaps by a skilled analyst composing it using a text editor. But the composition script could also represent a sophisticated combination of all the composition input passed down by all the upstream processes. Some might be passed down verbatim from the extraction script alone, such as "cut This Rectangle out of Position A on the bitmap and paste it into Position B". Others might be a combination, such as "cut This Rectangle from Position A, compose This Data taken from the extraction process into its center, and place the New Rectangle into Position B". And finally, instructions could also reflect Plan Generation results, such as "encode Job Number X into a bar code and place it into Position Y".

The fulfiller is free to make the composition script as simple or as complex as it wants, and to acquire it from whatever source is most convenient. Since the format of the instructions is controlled by the fulfiller, it does not need to be in any formal programming language. Therefore, the fulfiller is free to design the scripting protocol to require only the skills of a trained analyst, rather than a software engineer, to create them. The only requirement is that the instructions be based on the fact that the starting point is the original Customer Application PDL Job.

Thus, the fulfiller is free to tailor the composition process to meet its needs, since all three components (the script, the language, and the service) are all under the fulfiller's control and not dependent on any single vendor or product.

8. Multi-PDL RIP and Bitmap-Level Composition:

The first step in the final stage of the subject process is for the original Customer Application PDL Job to be rasterized once again. Because the rasterization is carried out by an identical copy of the system that rasterized it the first time, the fulfiller can count on the bitmaps it produces being identical copies of the ones produced the first time.

Once each page is rendered, and just before it is turned over to the print heads, the Composition Script is consulted to determine how the bitmap is to be changed from the original. The changes, for example, could include erasing the customer's original bar code symbols and replacing them with new fulfiller-compliant ones. The fulfiller is free to design the composition process to manipulate the image using in-house software, or to use whatever Commercial Off-The-Shelf (COTS) tools it chooses. The advantage for the fulfiller is, the process is based on the use of in-house and commodity products and is not dependent on any single supplier.

As was the case with the Extraction Script, the Composition Script is a wholly contrived device that operates independently of any COTS product, as is the manner in which the script and the composition service interact. Thus, the composition scripting "language" can, again, be in whatever format is most effective for the fulfiller, since all three components (the script, the language, and the service) are all under the fulfiller's control and not dependent on any single vendor or product.

Thus, the proposed composition service can be thought of as employing a tool box of any size that can handle whatever gamut of composition requirements are encompassed by the breadth of capabilities spanned by the suite of tools available, plus, the addition of new tools can only expand the breadth and widen the gamut.

Therefore, the subject process greatly reduces the programming effort, on both the client and the fulfiller side, required to onboard new fulfillment work, while providing the same or nearly the same breadth of services, without requiring substantial additional data center infrastructure to operate.

9. Alternate E-Z Digital Document Factory Process—Customer-Side (Additionally, See Specifically FIGS. 3A, 3B, and 3C and Detailed Discussion Below):

In the alternate subject process (termed the "Alternate E-Z" version); the job file is again in any of several industry-standard Page Description Language (PDL) formats, and as long as it contains sufficient identification information, no further processing on the Customer Side is necessary. It comes straight across to the Fulfiller Side unchanged.

10. Multi-PDL RIP and Bitmap-Level Extraction PLUS Special Case PDL-Level Place Holder Insertion:

Once a job file has crossed over to the Fulfillment Side, the job is turned over to the "Universal Multi-PDL RIP and Bitmap-Level Extraction PLUS Special Case PDL-Level Placeholder Insertion" process. Initially, this process is identical to the "Commercial Print Controller and RIP" process above, in that it supports a variety of industry standard PDL formats and produces bitmaps from them in a predictable way. However, the bitmaps are not turned over to print heads.

Once each page of bitmap data is generated, it is inspected in accordance with an application-specific "Extraction and Insertion Script". This script contains a list, or map, of regions on the document where information of a particular type is to be decoded from the arrays of and 0's that make up the bitmap.

The results of the decoding process, the metadata, are then translated into PDL-level flags, placeholders, content, and editing commands, in such a way that the commands are compatible with the original customer application PDL job format. The commands are then inserted into the original customer application PDL job, creating a new entity, the "Special Case PDL Job". The commands are inserted in such a way that each image's flags, placeholders, content, and editing commands are in the proper position to serve two purposes:

First, the flags, placeholders, and associated content function in sufficient accord with their counterparts in the Current State or Prior Art case to make the "Special Case PDL Job" meet the Fulfiller-Ready criteria described in that case. This makes the job as acceptable to the downstream components of the Current State Document Factory as any other Fulfiller-Ready PDL Job. Now all the fulfiller has to do is construct a single, corresponding Application Specific Extraction and Composition process, designated the "Special Case Efficient PDL-Level Metadata Extraction & Composition" process, and all compatible Customer Application PDL Jobs, even if they are different applications from different customers, can be processed by Current State Document Factory infrastructure, as long as they don't require processing beyond the limitations of the "Multi-PDL RIP and Bitmap-Level Extraction PLUS Special Case PDL-Level Place Holder Insertion" process and its associated Special Case Efficient PDL-Level Metadata Extraction and Composition process.

Second, the flags, placeholders, content, and editing commands, besides being compatible with Current State criteria, are also cleverly organized in such a way that the images ultimately produced by the Digital Printing Press still meet the "Customer-Spec Docs with Fulfiller-Spec Control Symbol" criteria, despite the fact that the original commands in Customer Application PDL Job may not have been changed or removed. So, for example, the construction of a particular Special Case PDL image could contain the following steps: 1) draw original bar code in format Alpha containing data Beta in position X1-Y1/X2-Y2 (this is the original command); 2) erase all data in position X1-Y1/X2-Y2; 3) draw replacement bar code in format Delta containing data Gamma in position X1-Y1-X2-Y2 (these are the inserted commands). The end result satisfies both the customer's and fulfiller's requirements even though the composition route was somewhat circuitous.

Therefore, the subject process also greatly reduces the programming effort, on both the client and the fulfiller side, required to onboard new fulfillment work, while providing the same or nearly the same breadth of services, without requiring substantial additional data center infrastructure to operate.

Figure 1B:
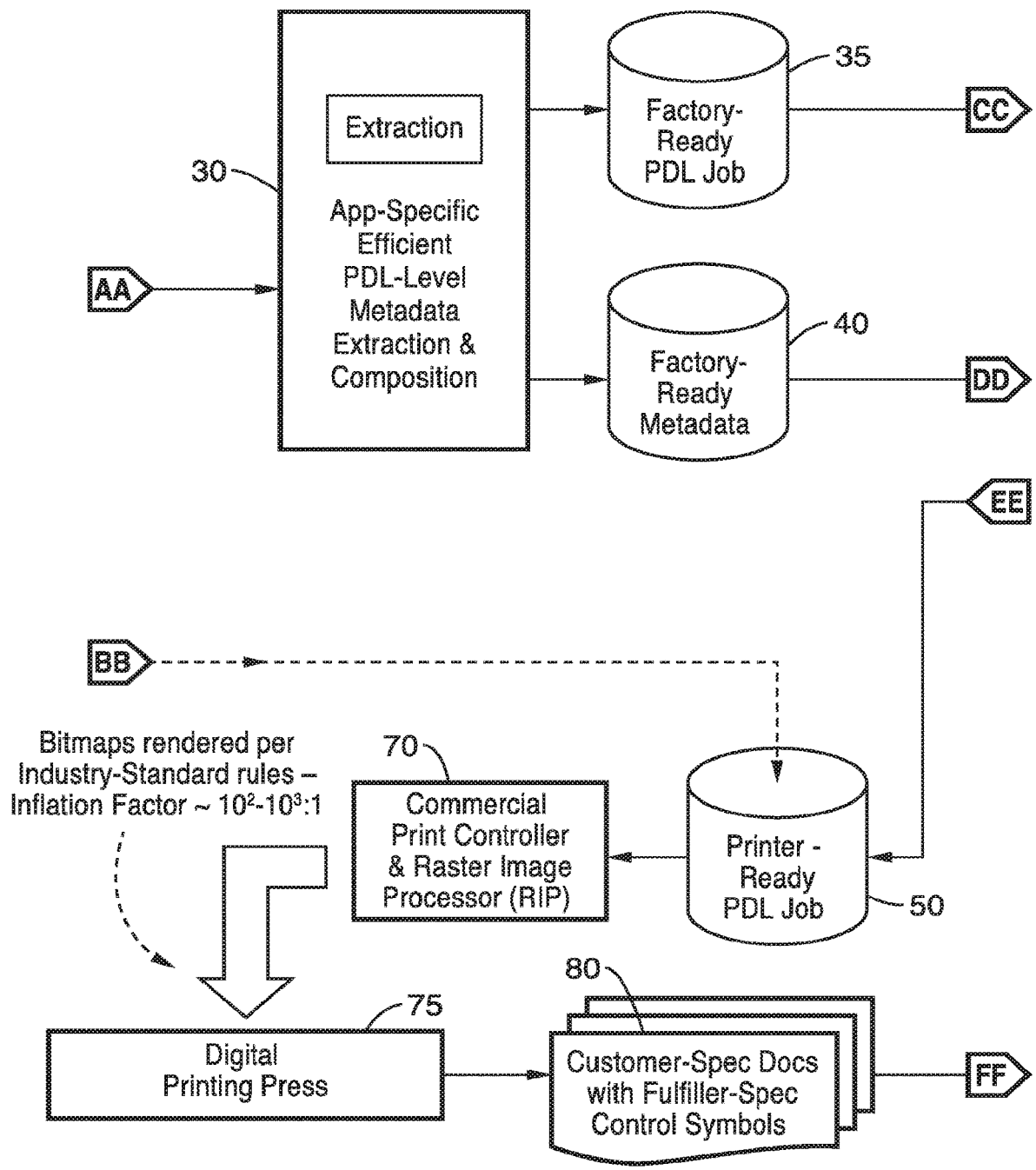
FIG. 1B depicts a second portion of the existing PRIOR ART for a "Current Digital Document Factory Process."
Figure 1C:
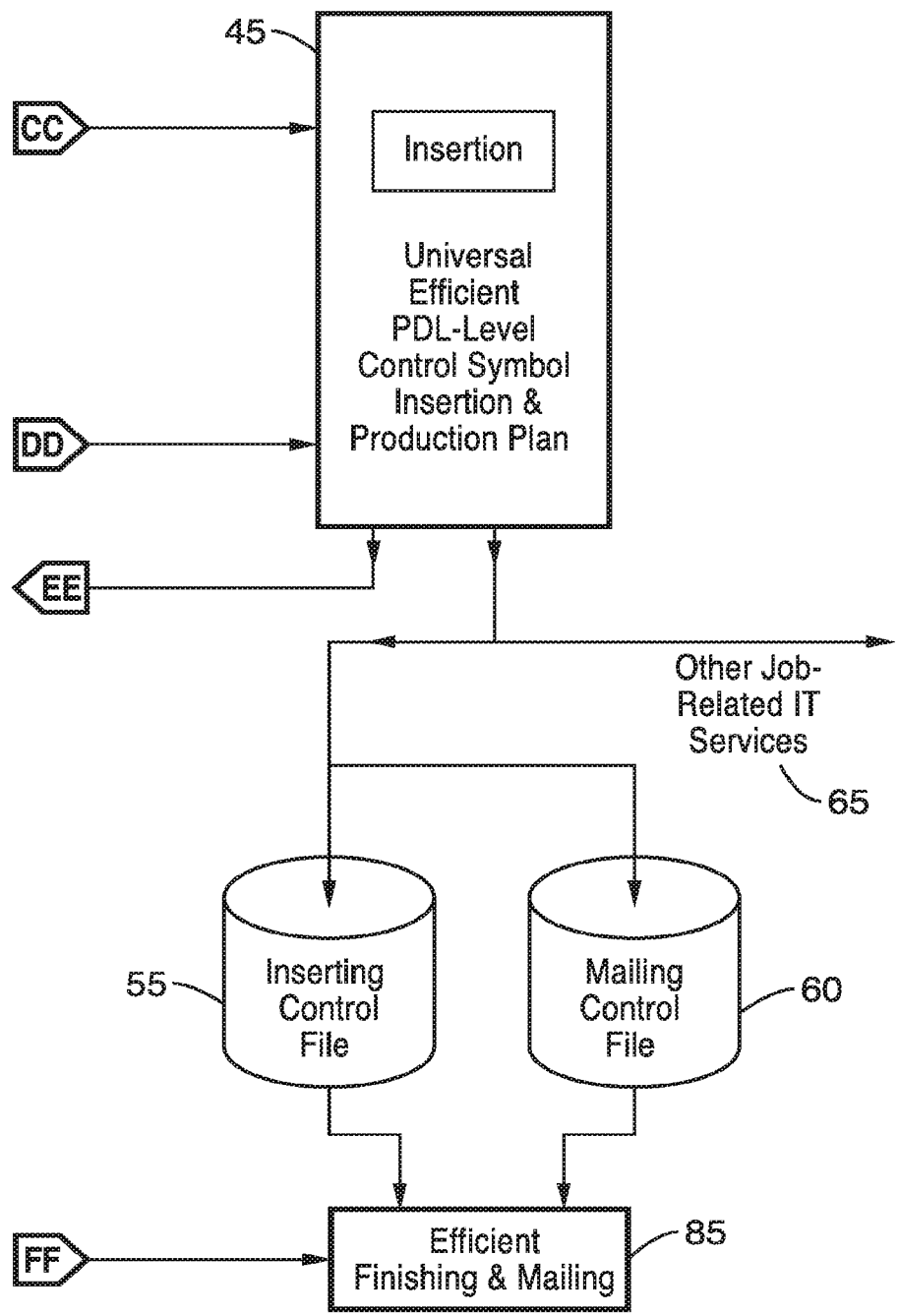
FIG. 1C depicts a third portion of the existing PRIOR ART for a "Current Digital Document Factory Process."

Once again for additionally clarity, FIGS. 1A, 1B, and 1C (labeled as PRIOR ART) illustrate the existing or current processing technique for digital documents. Depicted in FIG. 1A is the Customer Side of the process 5. The upper portion of FIG. 1A (to the left of the dashed lines) show the Customer Side of the process 5. Traditionally, the customer works with a Customer Application PDL Job 10. The customer is responsible for inserting Fulfiller-Compliant Metadata Flag and Control Symbol Placeholders 15 in each job to generate a Fulfiller-Ready PDL Job 20 (containing flag and control symbol placeholders) that is then transmitted to the Fulfiller by standard means. Both Customer Application 10 and Fulfiller Ready PDL Job 20 files are compact "Page Description Language" files, often of relatively equal sizes 22.

FIGS. 1B and 1C illustrate the Fulfillment Side 25 of the existing or current process in which the Fulfiller utilizes an Application-Specific Efficient PDL-Level Metadata Extraction and Composition step 30 (extracts information data from the incoming Job files and future printed pages) to produce both Factory-Ready PDL Job 35 and Factory-Ready Metadata 40 files that enter a Universal Efficient PDL-Level Control Symbol Insertion and Production Plan 45 (inserts information data into the received files and future printed pages). The output from here 45 goes to: 1) Printer-Ready PDL Job files 50; 2) Inserting Control files 55; 3) Mailing Control files 60; and 4) information for other job-related IT services 65. The Printer-Ready PDL Job files 50 are used in a Commercial Print Controller and Raster Image Processor (RIP) 70 for driving a Digital Printing Press 75 to create industry-standard bitmap renderings (inflation factor is approximately 100-1000:1) 136. The printed Customer-Spec Docs with Fulfiller-Spec Control Symbols are then handled by the Efficient Finishing and Mailing means 85, as controlled by the Inserting 55 and Mailing Control 60 files.

Figure 2A:
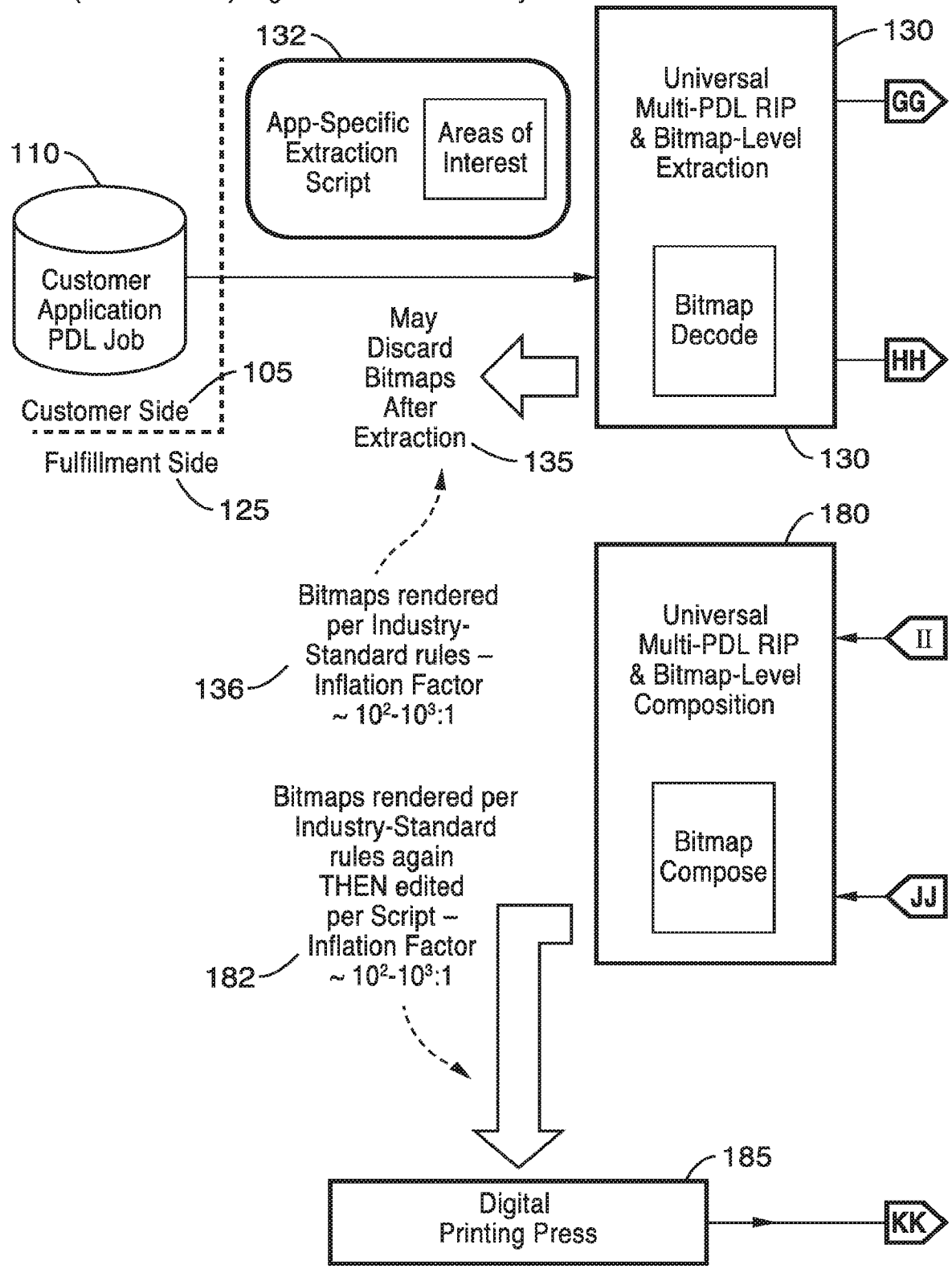
FIG. 2A shows a first portion of the subject technology for an embodiment of the "E-Z (for Customer) Digital Document Factory Process."
Figure 2B:
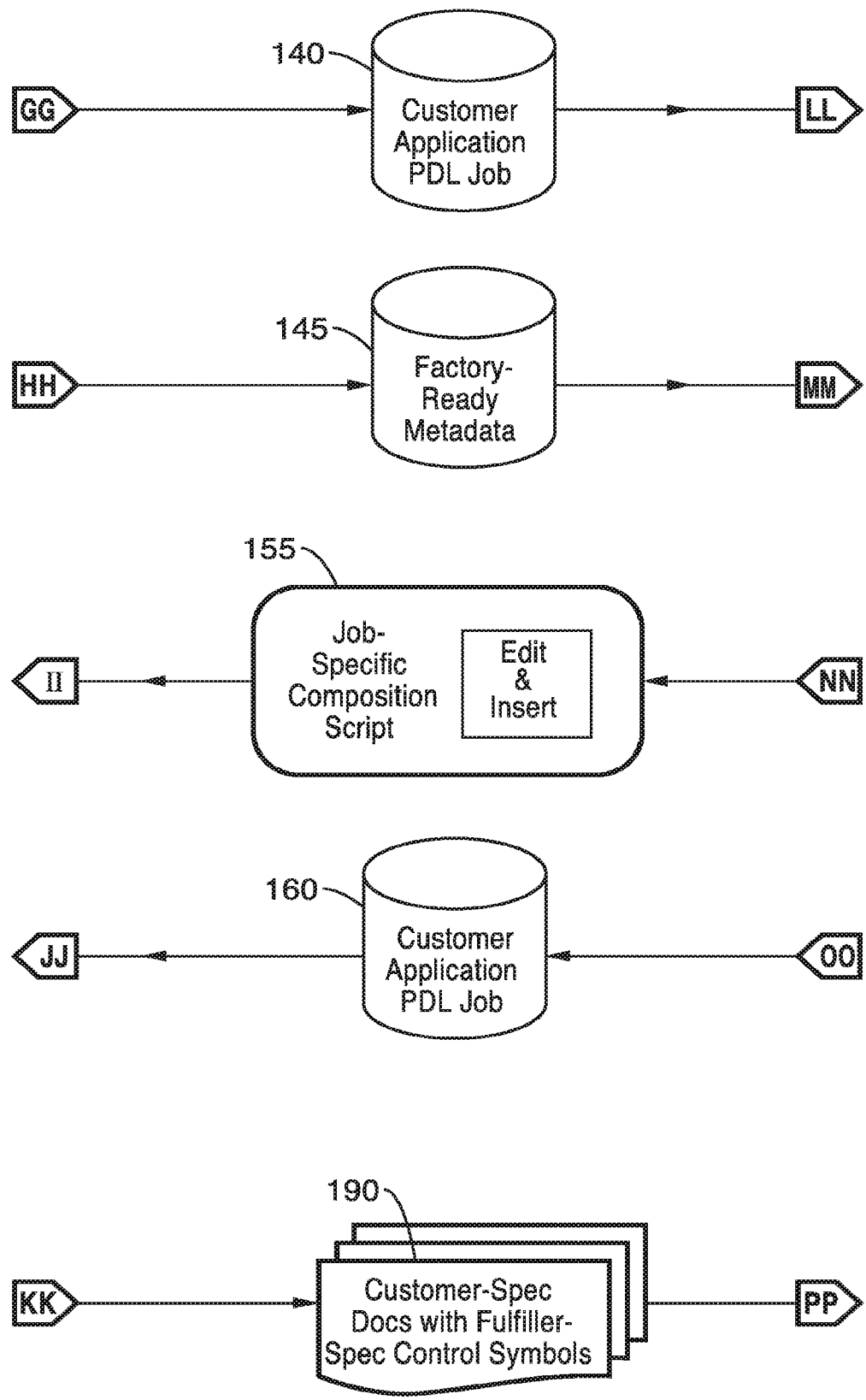
FIG. 2B shows a second portion of the subject technology for an embodiment of the "E-Z (for Customer) Digital Document Factory Process."
Figure 2C:
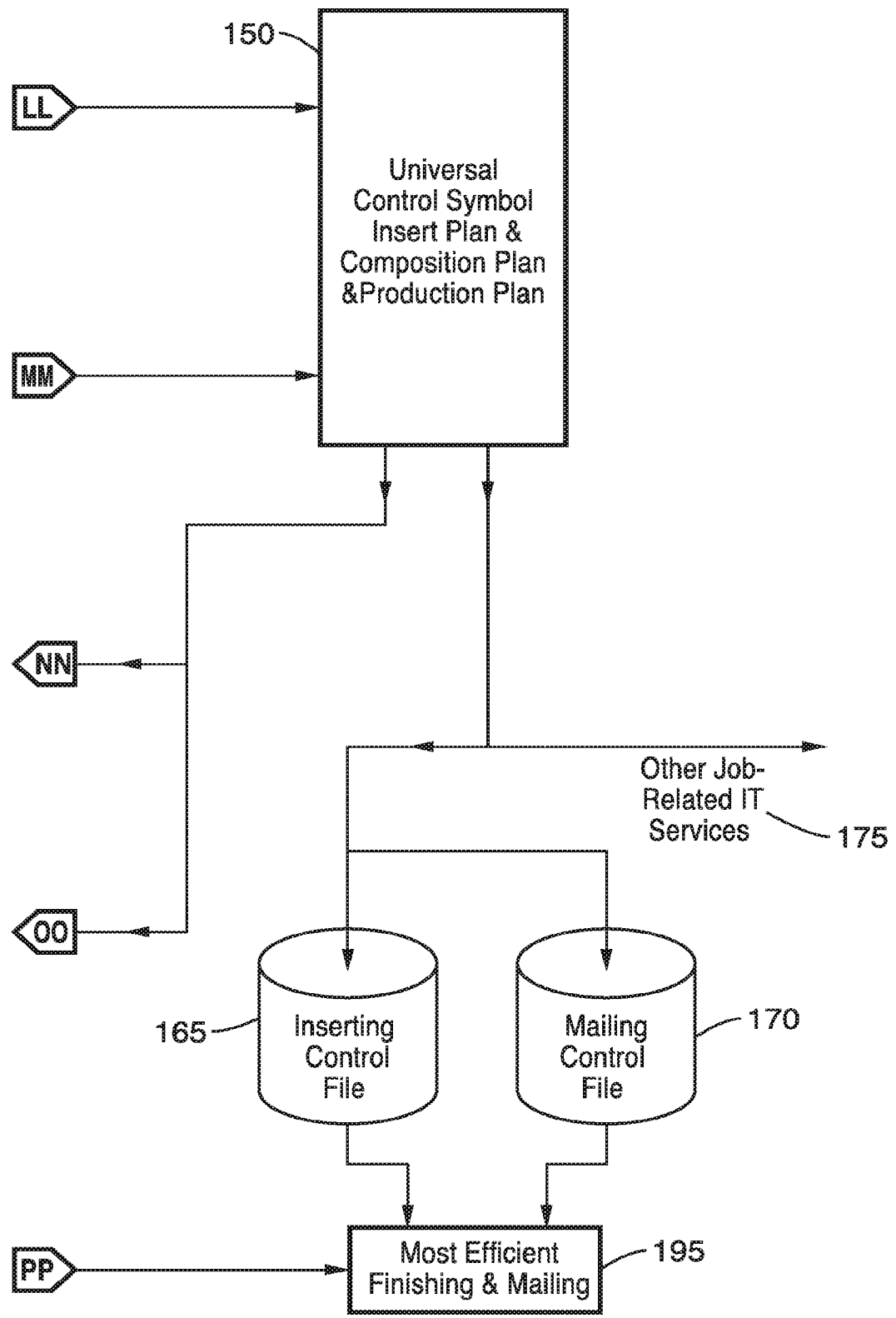
FIG. 2C shows a third portion of the subject technology for an embodiment of the "E-Z (for Customer) Digital Document Factory Process."

A first embodiment of the subject invention is specifically shown in FIGS. 2A, 2B, and 2C. The Customer Side 105 of the subject system and method is shown in the upper left corner of FIG. 2A, to the left of the dashed lines. The job first embodiment submission process is much easier for a customer utilizing the subject invention as opposed to the prior/existing process seen in FIGS. 1A, 1B, and 1C. Each Customer Application PDL Job file 110 is directly submitter to the Fulfiller (shown on the Fulfiller Side 115 in FIG. 2A) without flag and control symbol insertions. Most of FIGS. 2A, 2B, and 2C (other than the upper left corner of FIG. 2A) outlines the steps employed in the subject invention.

A Universal Multi-PDL RIP and Bitmap-Level Extraction unit 130 receives both the Customer Application PDL Job files 110 and Application-Specific Extraction Script 132. The Universal Multi-PDL RIP and Bitmap-Level Extraction unit 130 then outputs: 1) bitmaps that are rendered per industry-standard rules (inflation factor is approximately 100-1000:1) and may be discarded 135; 2) Customer Application PDL Job files 140; and 3) Factory-Ready Metadata files 145. The incoming Customer Application PDL Job 140 and Factory-Ready Metadata 145 files are received by a Universal Efficient Control Symbol Insert Plan, Composition Plan, and Production Plan integration unit 150 that outputs information for: 1) Job-Specific Composition Script 155; 2) Customer Application PDL Job files 160; 3) Inserting Control files 165; 4) Mailing Control files 170; and 5) information for other job-related IT services 175. The Job-Specific Composition Script 155 and Customer Application PDL Job files 160 are combined in the Universal Multi-PDL RIP and Bitmap-Level Composition processing unit 180 and sent to a Digital Printing Press 185 with the bitmaps rendered per industry-standard rules again and then edited per script (inflation factor is approximately 100-1000:1) 182. Finally, the Customer-Specific Documents with Fulfiller-Specific Control Symbols 190 are printed and process with the Efficient Finishing and Mailing unit 195 that utilizes the Inserting Control 165 and Mailing Control 170 files.

Figure 3A:
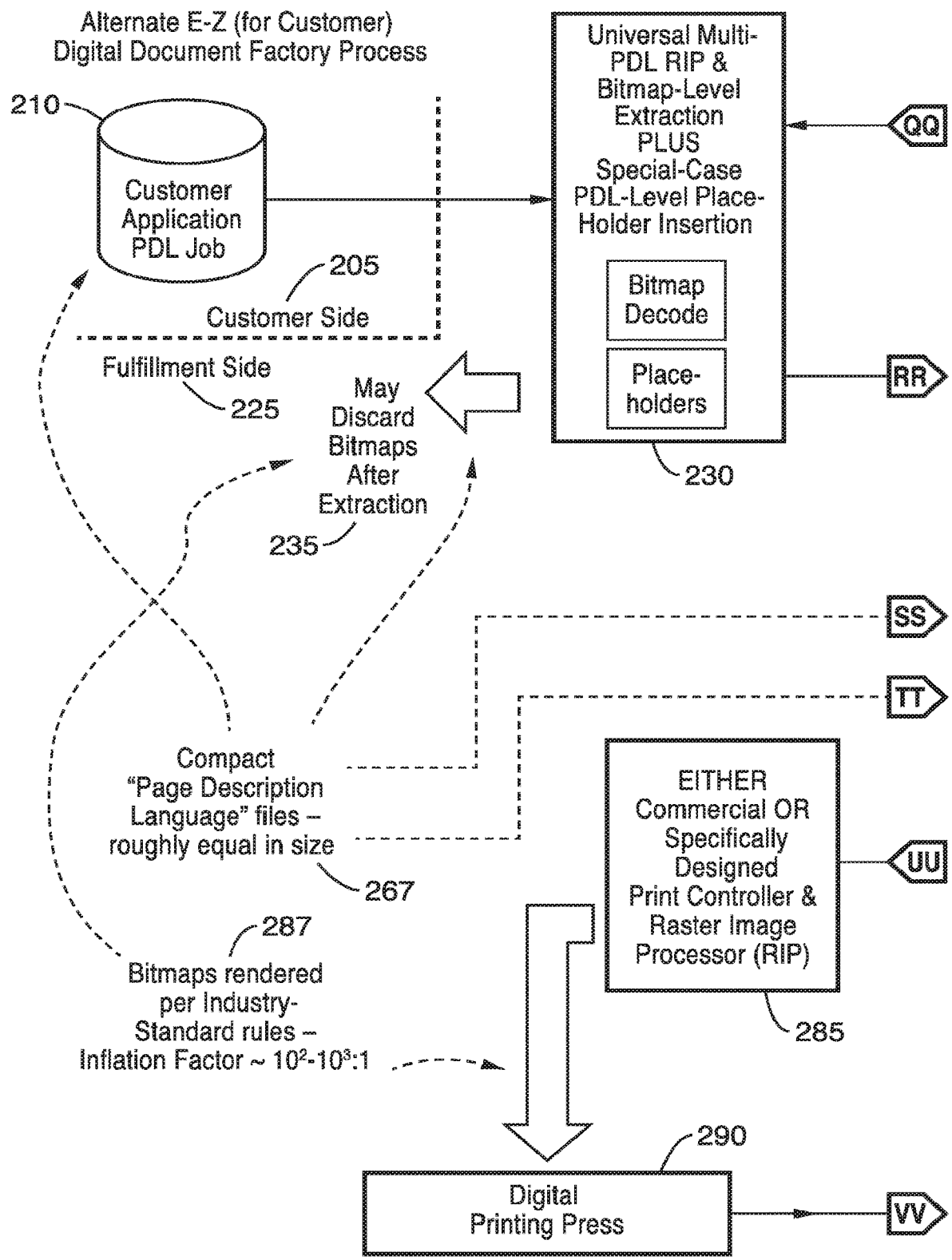
FIG. 3A shows a first portion of the subject technology for an alterative embodiment of the "E-Z (for Customer) Digital Document Factory Process."
Figure 3B:
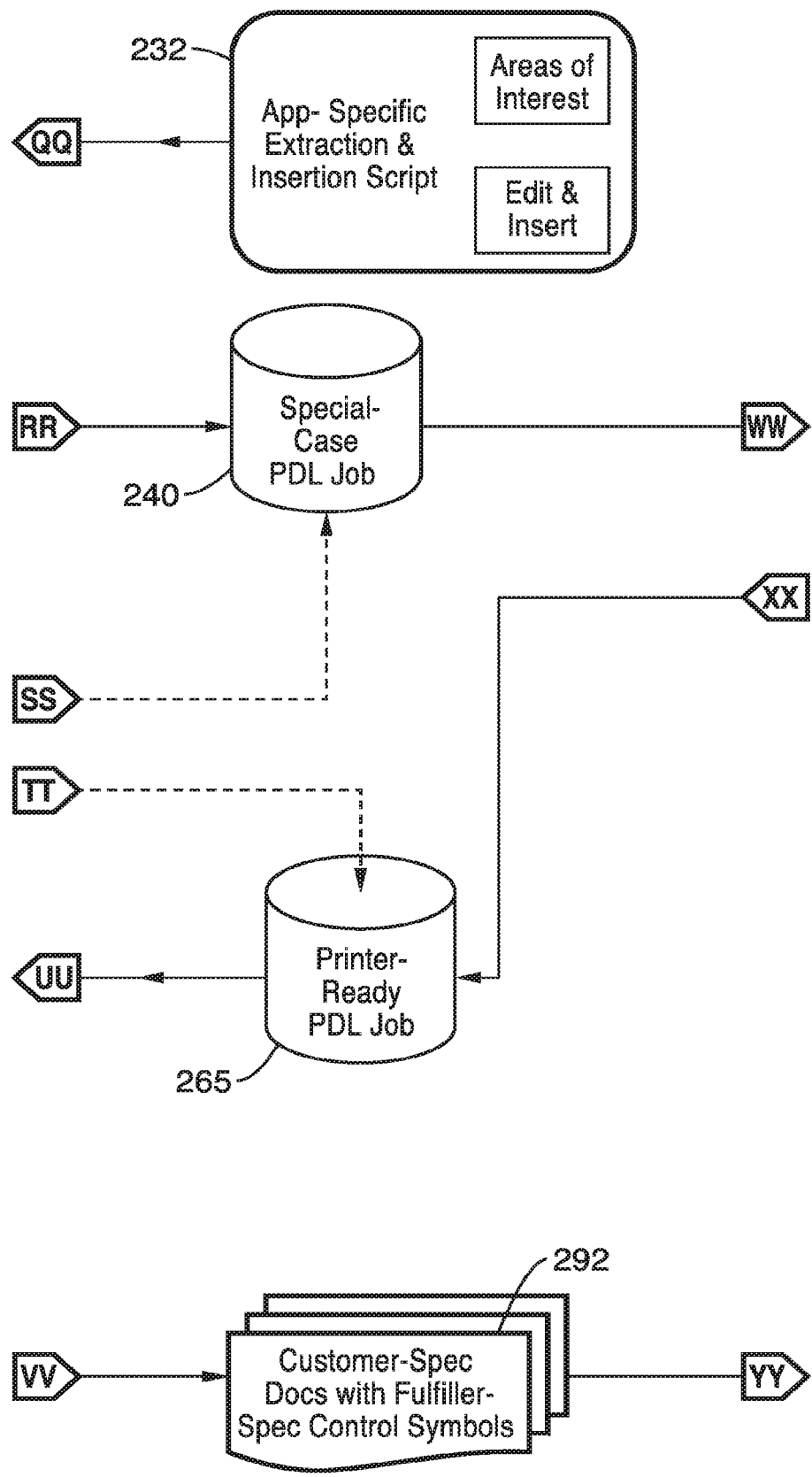
FIG. 3B shows a second portion of the subject technology for an alterative embodiment of the "E-Z (for Customer) Digital Document Factory Process."
Figure 3C:
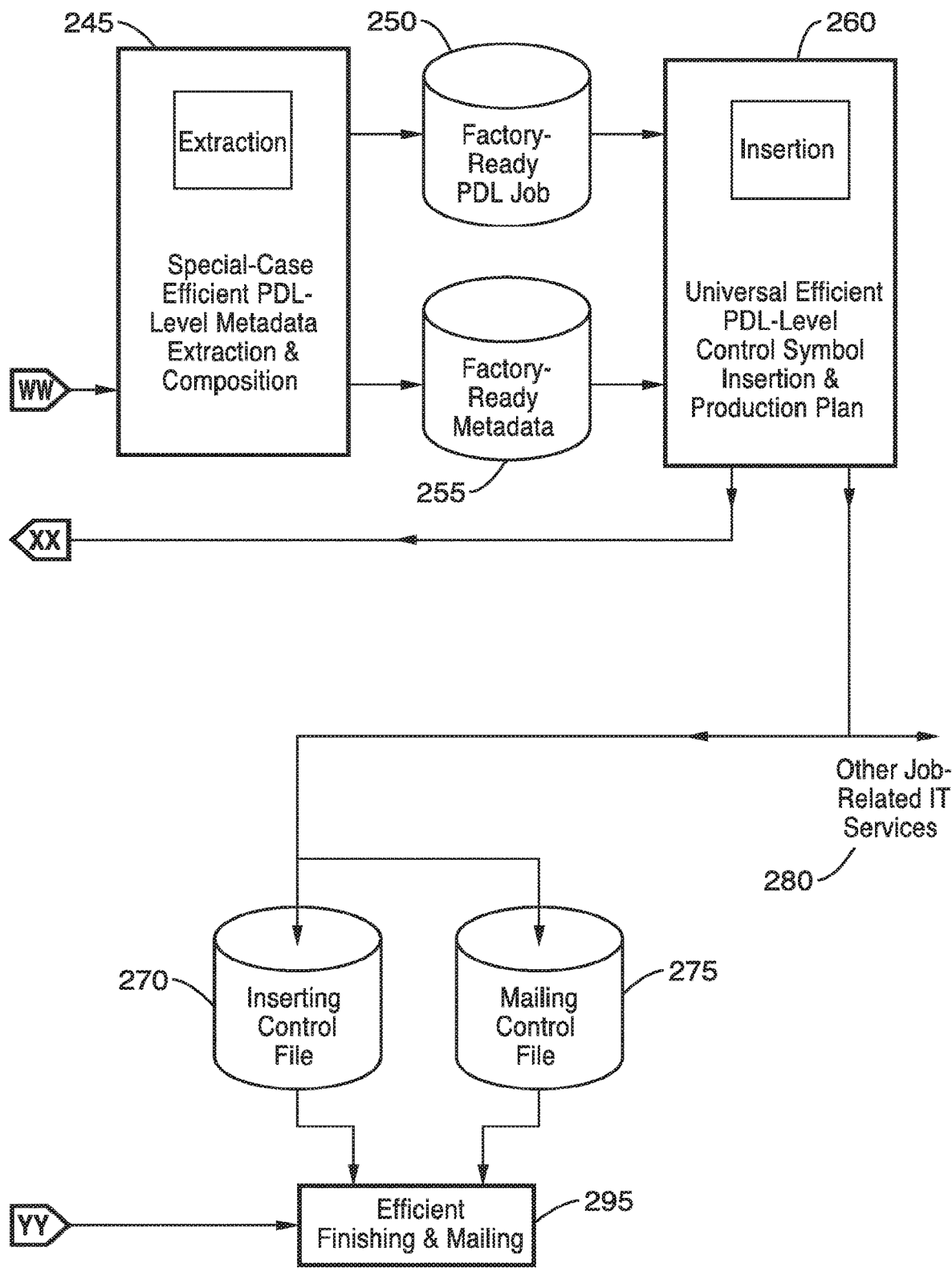
FIG. 3C shows a third portion of the subject technology for an alterative embodiment of the "E-Z (for Customer) Digital Document Factory Process."

A second embodiment of the subject invention is specifically shown in FIGS. 3A, 3B, and 3C. The Customer Side 205 is in the upper left corner of FIG. 3A, to the left of the dashed lines. The job submission process is much easier for a customer utilizing the second embodiment of the subject invention as opposed to the prior/existing process seen in FIGS. 1A, 1B, and 1C. Each Customer Application PDL Job file 210 is directly submitter to the Fulfiller (shown on the Fulfiller Side 215 in FIG. 3A) without flag and control symbol insertions. Most of FIGS. 3A, 3B, and 3C (other than the upper left corner of FIG. 3A) outlines the steps employed in the subject invention.

A Universal Multi-PDL RIP and Bitmap-Level Extraction PLUS Special-Case PDL-Level Place Holder Insertion unit 230 receives both the Customer Application PDL Job files 210 and Application-Specific Extraction and Insertion Script 232. The Universal Multi-PDL RIP and Bitmap-Level Extraction PLUS Special-Case PDL-Level Place Holder Insertion unit 230 then outputs: 1) bitmaps that may be discarded 235 and 2) Special-Case PDL files 240. The Special-Case PDL Job file move to the Special-Case Efficient PDL-Level Metadata Extraction and Composition unit 245 that outputs information for: 1) Factory-Ready PDL Job 250 files and 2) Factory-Ready Metadata 255 files. Both the Factory-Ready PDL Job 250 and Factory-Ready Metadata 255 files proceed to the Universal Efficient PDL-Level Control Symbol Insertion and Production Plan unit 260 that outputs information for: 1) Printer-Ready PDL Job files 265; 2) Inserting Control files 270; 3) Mailing Control files 275; and 4) information for other job-related IT services 280. The Page Description Language files 267 (i.e. 210, 240, and 265) are compact and approximately equal in size. The Printer-Ready PDL Job files 265 proceed to either a Commercial or Specifically Designed Print Controller and Raster Image Processor (RIP) unit 285 and from there to the Digital Printing Press 290 with the bitmaps rendered per industry-standard rules again and then edited per script (inflation factor is approximately 100-1000:1) 287. The bitmap rendering industry-standard rules 287 also applies to the Bitmaps After Extraction at step 235. Finally, the Customer-Specific Documents with Fulfiller-Specific Control Symbols 292 are printed and process with the Efficient Finishing and Mailing unit 295 that utilizes the Inserting Control 270 and Mailing Control 275 files.

Disclosed embodiments of the subject invention include a bitmap processing system for creating digital documents on a digital printing press by a fulfiller, comprising: a) a fulfiller operated raster image processor that receives customer application Page Description Language (PDL) job files containing information for creating the digital documents and generates bitmaps in accordance with the files and b) a fulfiller operated editor that modifies the bitmaps so that the resulting documents process more efficiently in production steps downstream of a printing process, wherein said more efficiently processed downstream production steps include finishing and mailing.

An additional embodiment is the digital document bitmap processing system noted above and further comprising an upstream utilization of a PDL editor that, using metadata extracted from the bitmaps, modifies an original customer application PDL, instead of the bitmaps, allowing the bitmaps to be discarded, with the resulting PDL alone carrying the necessary metadata via No Operation assembly language instructions (NOPs) and appropriate editing commands to alter the content of symbolic data such as letters, numbers, and bar codes, enabling the documents produced to process more efficiently in finishing and mailing production steps.

Another embodiment of the subject invention further comprises the upstream utilization of: a) a second fulfiller operated raster image processor that receives customer application PDL job files containing information for creating the digital documents and generates bitmaps in accordance with the files in an identical described manner and b) a fulfiller operated metadata extractor that analyzes the bitmaps to obtain information about the documents for use by downstream processes, the information being presented to the downstream processes not via the bitmaps, but via a metadata file, which, when processed alongside the original customer application PDL file, supports the creation and control of documents that process more efficiently in finishing and mailing production steps downstream of the printing process.

An additional embodiment of the subject invention comprises the digital document bitmap processing system described above and further comprising the upstream utilization of: a) a second fulfiller operated raster image processor that receives customer application PDL job files containing information for creating the digital documents and generates bitmaps in accordance with the files and in a manner identical to that described above and b) a fulfiller operated metadata extractor that analyzes the bitmaps to obtain information about the documents for use by downstream processes, the information being presented to the downstream processes not via the bitmaps, but via additional PDL job file commands inserted into the original customer application PDL file, such that the single, new combined PDL job file alone supports a creation and control of documents that process more efficiently in finishing and mailing production steps downstream of the printing process.

Another embodiment of the subject digital document bitmap processing system, further comprises the utilization of job specific scripts that enable the system's behavior to be customized for each job.

Still another embodiment of the subject digital document bitmap processing system, further comprises the utilization of a fulfiller operated universal efficient control symbol insert plan, composition plan, and production plan integration unit that receives said customer application PDL job and metadata files and outputs processed information for said job for job-specific composition script processing and to a customer application PDL job file, an inserting control file, and a mailing control file.

Also, included is an embodiment of the subject digital document bitmap processing system that further comprises an interfaced computer have programming that oversees and controls the bitmap processing system.

Method embodiments are also disclosed that include a method for creating digital documents on a digital printing press by a fulfiller utilizing bitmap processing of data, comprising the steps: a) extracting document-related information by a fulfiller operated universal multi-PDL raster image processor and bitmap-level extraction unit that receives customer application PDL job files containing information for creating the digital documents and application-specific extraction script and outputs customer application PDL job files and factory-ready metadata files; b) processing document-related information by a fulfiller operated universal efficient control symbol insert plan, composition plan, and production plan integration unit that receives the customer application PDL job and factory-ready metadata files and outputs processed information for the job for job-specific composition script processing and to a customer application PDL job file, an inserting control file, and a mailing control file; and c) manipulating document-related information by a fulfiller operated universal multi-PDL raster image processor and bitmap-level composition processing unit that accepts the incoming job-specific composition script and customer application PDL job file and communicates bitmap printing information to the digital printing press to generate customer-specific documents with fulfiller-specific control symbols.

Additionally, disclosed is a method for creating digital documents by bitmap processing that further comprising the step of inserting control and mailing control files being employed to produce efficient finishing and mailing of the digital documents.

Also, disclosed is a method for creating digital documents by bitmap processing that further comprises the step of controlling the bitmap processing system by means of an interfaced computer having programming that oversees the operation of the bitmap processing system.

Embodiments of the subject technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart (s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A bitmap processing system for creating digital documents, comprising:
    a fulfiller operated raster image processor that:
        receives customer application Page Description Language (PDL) job files containing information for creating the digital documents;
        generates bitmaps in accordance with the customer application PDL job files; and
        extracts and outputs customer application PDL job files and factory-ready metadata files using an application-specific extraction script on the bitmaps for more efficient processing including finishing and mailing.

2. The bitmap processing system of claim 1, wherein the fulfiller operated raster image processor uses the application-specific extraction script including a map of regions of each bitmap of the bitmaps to identify and extract information of a particular type.

3. The bitmap processing system of claim 2, wherein the application-specific extraction script decodes the information of each particular type to produce the factory-ready metadata files.

4. The bitmap processing system of claim 1, wherein the fulfiller operated raster image processor generates a job plan for each bitmap using a composition script to prepare each bitmap for printing.

5. The bitmap processing system of claim 4, wherein the composition script further inserts control symbols into the customer application PDL job files based on the factory-ready metadata files.

6. A method, comprising:
    receiving, by at least one processor, customer application Page Description Language (PDL) job files containing information for creating the digital documents;
    generating, by the at least one processor, bitmaps in accordance with the PDL job files;
    extracting, by the at least one processor, customer application PDL job files and factory-ready metadata files using an application-specific extraction script on the bitmaps for more efficient processing including finishing and mailing; and
    outputting, by the at least one processor, the customer application PDL job files and the factory-ready metadata files with the bitmaps of the file.

7. The method of claim 6, wherein the fulfiller operated raster image processor uses the application-specific extraction script including a map of regions of each bitmap of the bitmaps to identify and extract information of a particular type.

8. The method of claim 7, wherein the application-specific extraction script decodes the information of each particular type to produce the factory-ready metadata files.

9. The method of claim 6, wherein the fulfiller operated raster image processor generates a job plan for each bitmap using a composition script to prepare each bitmap for printing.

10. The method of claim 9, wherein the composition script further inserts control symbols into the customer application PDL job files based on the factory-ready metadata files.

* * * * *